United States Patent
Schiffmann (10) Patent No.: US 6,292,759 B1
(45) Date of Patent: Sep. 18, 2001

(54) VEHICLE ATTITUDE ANGLE ESTIMATION USING SENSED SIGNAL BLENDING

(75) Inventor: Jan Konried Schiffmann, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/196,380

(22) Filed: Nov. 19, 1998

(51) Int. Cl.$^7$ .................................................. G01C 17/00
(52) U.S. Cl. .............................. 702/151; 701/36; 701/35; 701/38; 701/45; 701/110; 340/440
(58) Field of Search .................................. 702/150, 151, 702/152, 153; 701/4, 36, 37, 38, 41, 42, 43, 44, 45, 46; 340/429, 436, 440

(56) References Cited

U.S. PATENT DOCUMENTS

| | | | |
|---|---|---|---|
| 4,834,205 | * | 5/1989 | Mizuno et al. ...................... 180/141 |
| 5,610,575 | | 3/1997 | Gioutsos .............................. 340/429 |
| 6,002,975 | * | 12/1999 | Schiffmann et al. ................. 701/36 |
| 6,055,472 | * | 4/2000 | Breunig et al. ....................... 701/45 |
| 6,073,065 | * | 6/2000 | Brown et al. .......................... 701/36 |
| 6,104,284 | * | 8/2000 | Otsuka ................................ 340/440 |

FOREIGN PATENT DOCUMENTS

| | | | |
|---|---|---|---|
| 19609717 | 8/1997 | (DE) . | |
| 19606043 | 9/1997 | (DE) . | |
| 19609176 | 9/1997 | (DE) . | |
| 2314187 | 12/1998 | (GB) ............................ B60R/21/00 |

* cited by examiner

Primary Examiner—Arthur T. Grimley
Assistant Examiner—John Le
(74) Attorney, Agent, or Firm—Jimmy L. Funke (57) ABSTRACT

An attitude angle estimator and method of estimating attitude angle of a vehicle. According to one embodiment, an angular attitude rate sensor senses angular attitude rate of a vehicle, and an accelerometer detects lateral or longitudinal acceleration. An attitude angle estimate is produced and is updated as a function of the sensed angular attitude rate. An acceleration-based attitude angle is determined as a function of the sensed acceleration, and a blending coefficient is provided. A *current vehicle attitude angle estimate is generated as a function of the updated attitude angle estimate, the acceleration-based attitude angle, and the blending coefficient. According to a second embodiment, both a roll angle estimate and a pitch angle estimate are determined.

25 Claims, 7 Drawing Sheets

VEHICLE ATTITUDE ANGLE ESTIMATION USING SENSED SIGNAL BLENDING

BACKGROUND OF THE INVENTION

The present invention generally relates to vehicle attitude angle sensing, and more particularly, to low-cost roll and pitch angle estimation for a vehicle.

Future generation automotive vehicles may increasingly employ safety-related devices that deploy in the event that the vehicle rolls over to provide added protection to the occupants of the vehicle. For example, upon detecting a vehicle rollover condition, a pop-up roll bar can be deployed such that, when activated, the roll bar further extends vertically outward to increase the height of support provided by the roll bar. Other controllable features may include actuating deployment of one or more air bags, such as front or side deployment air bags, or actuating a pretensioner to pretension a restraining device, such as a seat belt or safety harness, to prevent occupants of the vehicle from ejecting from the vehicle or colliding with the roof of the vehicle.

In the past, basic rollover sensors have been employed in automotive vehicles to measure the angular position of the vehicle from which a rollover condition can be determined. The basic rollover sensors have included the use of a pendulum normally hanging vertically downward due to the earth's gravitational force. Many basic automotive sensing devices are employed simply to monitor the angular position of the vehicle relative to a level ground horizontal position. As a consequence, the basic automotive vehicle rollover sensors have generally been susceptible to error when the vehicle travels around a turn or becomes airborne, in which case the earth's gravitational force, which the sensor relies on, may be overcome by other forces.

More recently, sophisticated rollover sensing approaches have been considered. One such approach considered requires the use of six sensors including three accelerometers and three angular rate sensors, also referred to as gyros, all of which are employed together for use in an inertial navigation system which tracks position and attitude of the vehicle. The three accelerometers generally provide lateral, longitudinal, and vertical acceleration measurements of the vehicle, while the three gyros measure pitch rate, roll rate, and yaw rate. In sensing a rollover condition, the system determines a vehicle roll angle. However, the more sophisticated conventional rollover sensing approaches generally require a large number of high-precision and expensive sensors. In addition, known sophisticated systems are susceptible to cumulative drift errors, and therefore must be reset occasionally.

It should be appreciated that various other applications may require knowledge of the roll and pitch attitude angles of a vehicle as the vehicle maneuvers on the ground. In addition to rollover detection, attitude angle estimators may be employed to provide a roll and pitch angle indications to the driver or other occupants of the vehicle. In the past, attitude angle estimators have employed one or more accelerometers and an angular rate sensor for each axis of rotation of the vehicle. However, there exists the problem of how to combine angle-related information contained in the accelerometer and angular rate sensor in order to obtain an overall attitude angle measurement. This is because each type of sensor generally has characteristic failings in the conventional applications. For example, the accelerometer-based attitude angle estimate is generally relatively noisy when the vehicle is traveling on a rough road surface, and may sustain large errors whenever the vehicle's trajectory involves an inertial acceleration having a component perpendicular to the rotational axis under consideration. In addition, the angular rate sensor estimate, which is typically obtained by integrating the angular rate sensor's output signal, generally has a tendency to drift with an ever-increasing error due to unknown bias or offset in the sensed angular rate signal.

It is, therefore, one object of the present invention to provide for an attitude angle estimator that provides an estimation of the attitude angle of a vehicle and minimizes errors that may be present in automotive-grade sensors. It is another object of the present invention to provide for an attitude angle estimator that combines vehicle sensed signals to obtain an overall more accurate attitude angle estimation. It is a further object of the present invention to provide for a vehicle roll angle estimator and/or vehicle pitch angle estimator that minimizes the effects of noise present in an accelerometer based angle estimate, and minimizes error present in an angular rate sensed signal.

SUMMARY OF THE INVENTION

In accordance with the teachings of the present invention, an attitude angle estimator and method of estimating attitude angle of a vehicle are provided for estimating the roll and/or pitch angle. The attitude angle estimator employs an angular attitude rate sensor for sensing angular attitude rate of a vehicle and producing an output signal, and an accelerometer for detecting lateral or longitudinal acceleration of the vehicle and producing an output signal. A controller determines an acceleration-based attitude angle as a function of the sensed acceleration. The controller determines an attitude angle estimate and updates the attitude angle estimate as a function of the angular attitude rate. The controller further provides a blending coefficient and further updates the attitude angle estimate so as to generate a current vehicle attitude angle estimate as a function of the acceleration-based attitude angle and the blending coefficient, and produces a vehicle angle estimate signal, such as a roll angle estimate and/or a pitch angle estimate.

The method for estimating an attitude angle of a vehicle according to the present invention includes sensing angular attitude rate of a vehicle and producing an output signal, and sensing a lateral or longitudinal acceleration of the vehicle and producing an output signal. The method also includes determining an acceleration-based attitude angle as a function of the sensed acceleration. An attitude angle estimate is provided and is updated as a function of the angular attitude rate. A blending coefficient is also provided. The method further updates the attitude angle estimate to generate a current vehicle attitude angle estimate as a function of the acceleration-based attitude angle and the blending coefficient. The vehicle attitude angle estimate may include a roll angle estimate and/or a pitch angle estimate.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
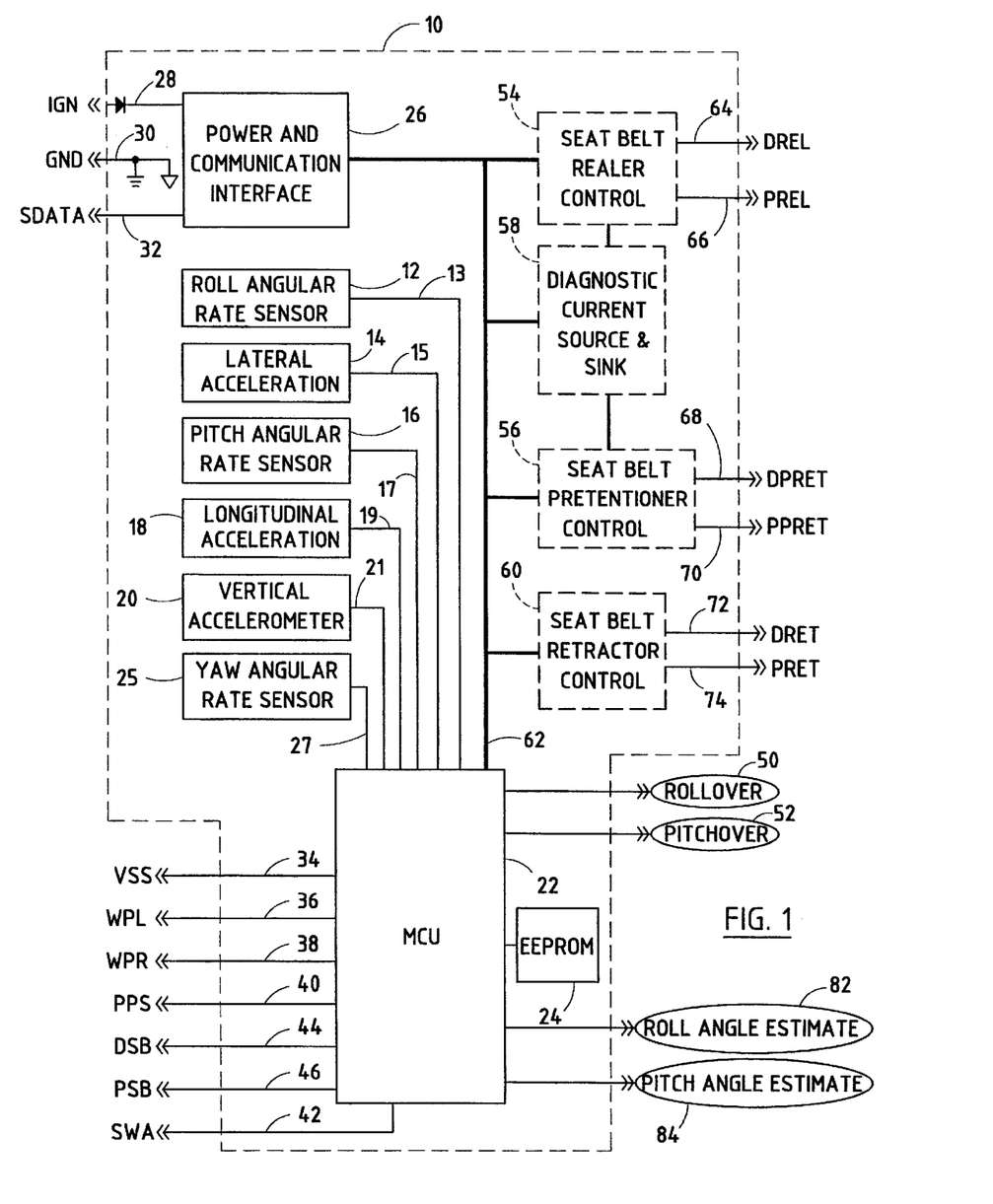
FIG. 1 is a block diagram of an attitude angle estimator/rollover sensing module for estimating vehicle roll angle and pitch angle according to the present invention, and for further predicting vehicle rollover and pitchover.

Referring to FIG. 1, a vehicle angle estimator/rollover sensing module 10 is illustrated for use in sensing vehicle attitude angular rate and acceleration dynamics, estimating angular roll and pitch angles, and predicting a rollover and/or pitchover condition of an automotive vehicle (not shown). The sensing module 10 of the present invention is preferably mounted on an automotive vehicle and used to estimate the roll and/or pitch attitude angles, and may further predict future rollover and pitchover conditions of the vehicle, according to the example shown. The attitude angle estimation may include a roll angle estimation which is the angular side-to-side rotation about the vehicle's longitudinal axis, or a pitch angle estimation which is a front-to-back angular rotation about the vehicle's lateral axis, or may be used to determine both roll and pitch angle estimations. A vehicle rollover condition, as described herein in connection with the present invention, may include side-to-side rotation of the vehicle about the vehicle's longitudinal axis, commonly referred to as a "vehicle rollover," and back-to-front rotation about the vehicle's lateral axis, commonly referred to as a "vehicle pitchover," or a combination of rollover and pitchover. For purposes of describing the rollover sensing of the present invention, the term "rollover" is generally used to refer to either a rollover condition or a pitchover condition.

The sensing module 10 is designed to be located in an automotive vehicle to sense vehicle dynamics, estimate roll and pitch attitude angles, and predict rollover or pitchover conditions of the vehicle. Upon predicting a vehicle rollover or pitchover condition, the sensing module 10 may provide an output signal indicative of the predicted rollover or pitchover condition. The rollover or pitchover condition output signal may be supplied to one or more selected vehicle devices, such as safety-related devices, to actuate the selected devices in anticipation of an upcoming rollover event. The predicted rollover or pitchover condition output signal may be employed to deploy a pop-up roll bar to provide extended lateral support to the occupants of the vehicle just prior to the actual vehicle rollover occurring. Similarly, the predicted rollover or pitchover condition output signal may actuate an occupant restraining device, such as a seat belt or safety harness pretensioner to eliminate slack in the restraining device just prior to the vehicle rollover occurring. Other controlled functions include deployment of front and/or side deployment air bags to protect the vehicle occupants during a vehicle rollover. These and other devices may be controlled in response to the rollover condition output signal.

The sensing module 10 shown herein includes six sensors, all preferably assembled together on module 10, and oriented to perform the intended sensing operation. The sensors include a roll angular rate sensor 12, a pitch angular rate sensor 16, a lateral accelerometer 14, a longitudinal accelerometer 18, a vertical accelerometer 20, and a yaw angular rate sensor 25. The roll angular rate sensor 12 measures the time rate of angular roll 13 about the vehicle's longitudinal axis, while the pitch rate sensor 16 measures the time rate of angular pitch 17 about the vehicle's lateral axis. The lateral accelerometer 14 measures acceleration 15 of the vehicle along the vehicle's lateral axis. The longitudinal accelerometer 18 measures acceleration 19 of the vehicle along the vehicle's longitudinal axis. The vertical accelerometer 20 measures the acceleration 21 of the vehicle along the vehicle's vertical axis. The yaw angular rate sensor 25 measures the yaw rate 27 about the vertical axis of the vehicle.

The sensing module 10 further includes a microprocessor control unit (MCU) 22 for processing sensed vehicle parameters according to an attitude angle estimator algorithm, and may further include a rollover sensing algorithm to predict vehicle rollover and pitchover conditions. MCU 22 is preferably a microprocessor-based controller and, according to one example, may include Model No. HC12 made available by Motorola. Associated with MCU 22 is an electrically erasable programmable read-only memory (EEPROM) 24 that stores various programmed calibrations for performing the attitude angle estimator algorithm as is explained hereinafter, and may further store programmed calibrations for the rollover sensing algorithm. The EEPROM 24 can be integrated with the MCU 22 or provided external thereto. Sensing module 10 further includes a power and communication interface 26 for receiving an ignition IGN1 signal on line 28 and communicating via serial data (SDATA) on serial data bus 32. Sensing module 10 is further grounded via ground line 30. Power and communication interface 26 converts an approximately 12-volt DC IGN1 signal input to 5-volts DC for use as a power supply to the components on module 10. Serial data communicated on data bus 32 may include individual sensor outputs and processor outputs as well as programmed inputs.

MCU 22 receives, as inputs, signals from each of sensors 12, 14, 16, 18, 20, and 25. In addition, the MCU 22 receives other various inputs that may be employed in connection with the attitude angle estimation and rollover and pitchover predicting of the present invention. These inputs may include a vehicle speed sensor (VSS) signal 34 indicative of the speed of the vehicle and auxiliary left and right wheel position sensors (WPL) and (WPR) signals 36 and 38 for providing an indication of whether the wheels on either the left or right side of the vehicle are not in contact with the ground. The auxiliary wheel position sensors signals 36 and 38 are wheel position measurements taken relative to the body of the vehicle. Other inputs include a passenger presence (PPS) signal 40, which may be generated as a sensed output from an occupant presence sensor for purposes of sensing the presence of a passenger. A driver's seat belt (DSB) signal 44 and a passenger's seat belt (PSB) signal 46 indicate the use of driver and passenger seat belts, respectively. Also provided is a steering wheel angle (SWA) signal 42 for providing an indication of the current vehicle steering wheel angle relative to the longitudinal axis of the vehicle.

MCU 22 processes the various input signals and produces output signals identified as ROLLOVER signal 50 and PITCHOVER signal 52, which are indicative of a predicted vehicle rollover condition and a predicted pitchover condition, respectively. In addition, MCU 22 provides the predicted rollover and pitchover output signals on line 62 to control designated onboard control devices, such as a seat belt reeler control 54, a lap seat belt pretensioner control 56, and a seat belt retractor control 60. Seat belt reeler control 54 controls the seat belt reeler for both the driver's side and passenger's side via respective signals DREL and PREL as provided on output line 64 and 66, respectively. Seat belt pretensioner control 56 likewise controls seat belt pretensioning for the driver's side and passenger's side via signals DPRET and PPRET as provided on output lines 68 and 70, respectively. A diagnostic current source and sink 58 allows for diagnostic testing of the seat belt reeler control 54 and seat belt pretensioner 56. The seat belt retractor control 60 controls retractor locks associated with the seat belt to both the driver's seat belt and passenger's seat belt via signals DRET and PRET, as provided on output lines 72 and 74.

According to the present invention, MCU 22 processes the various input signals and produces attitude angle output signals identified as roll angle estimate signal 82 and pitch angle estimate signal 84, which are indicative of an estimated vehicle roll and pitch angles, respectively. The estimated roll and pitch angles 82 and 84 may be output to a display for displaying the current estimated roll and pitch angles of the vehicle for viewing by the vehicle occupants. The estimated roll and pitch angles 82 and 84 can be used to produce the rollover and pitchover signals 50 and 52. Examples of rollover sensing modules for predicting vehicle rollover and pitchover conditions of a vehicle are disclosed in U.S. patent application Ser. No. 09/020,140, issued as U.S. Pat. No. 6,002,975, entitled "Vehicle Rollover Sensing," U.S. patent application Ser. No. 09/019,878, issued as U.S. Pat. No. 6,002,974, "Vehicle Rollover Sensing Using Extended Kalman Filter," and U.S. patent application Ser. No. 09/020,137, issued as U.S. Pat. No. 6,038,495, entitled "Vehicle Rollover Sensing Using Short-term Integration," all of which were filed on Feb. 6, 1998. The disclosure of each of the aforementioned patent applications are hereby incorporated by reference. While an Example of rollover and pitchover sensing is provided herein, it should be appreciated that the roll and pitch angle estimator and method of the present invention may be employed for various other applications.

The vehicle attitude angle estimation of the present invention derives an angle estimate from one or more accelerometers, and combines the acceleration-based angle estimate with the angular rate signals to obtain a overall angle estimate. This may include providing for either a roll angle estimate or a pitch angle estimate, or a combination of roll and pitch angle estimates. It should be appreciated that the method for obtaining the accelerometer-based angle estimate may vary with the number and configuration of accelerometers that are available, as well as the availability of other external signals, such as vehicle speed and yaw rate signals. Two embodiments for estimating attitude angles for single-axis (roll or pitch) and dual-axes (roll and pitch) of a vehicle are provided in FIGS. 2 and 3, and are explained hereinafter.

Figure 2:
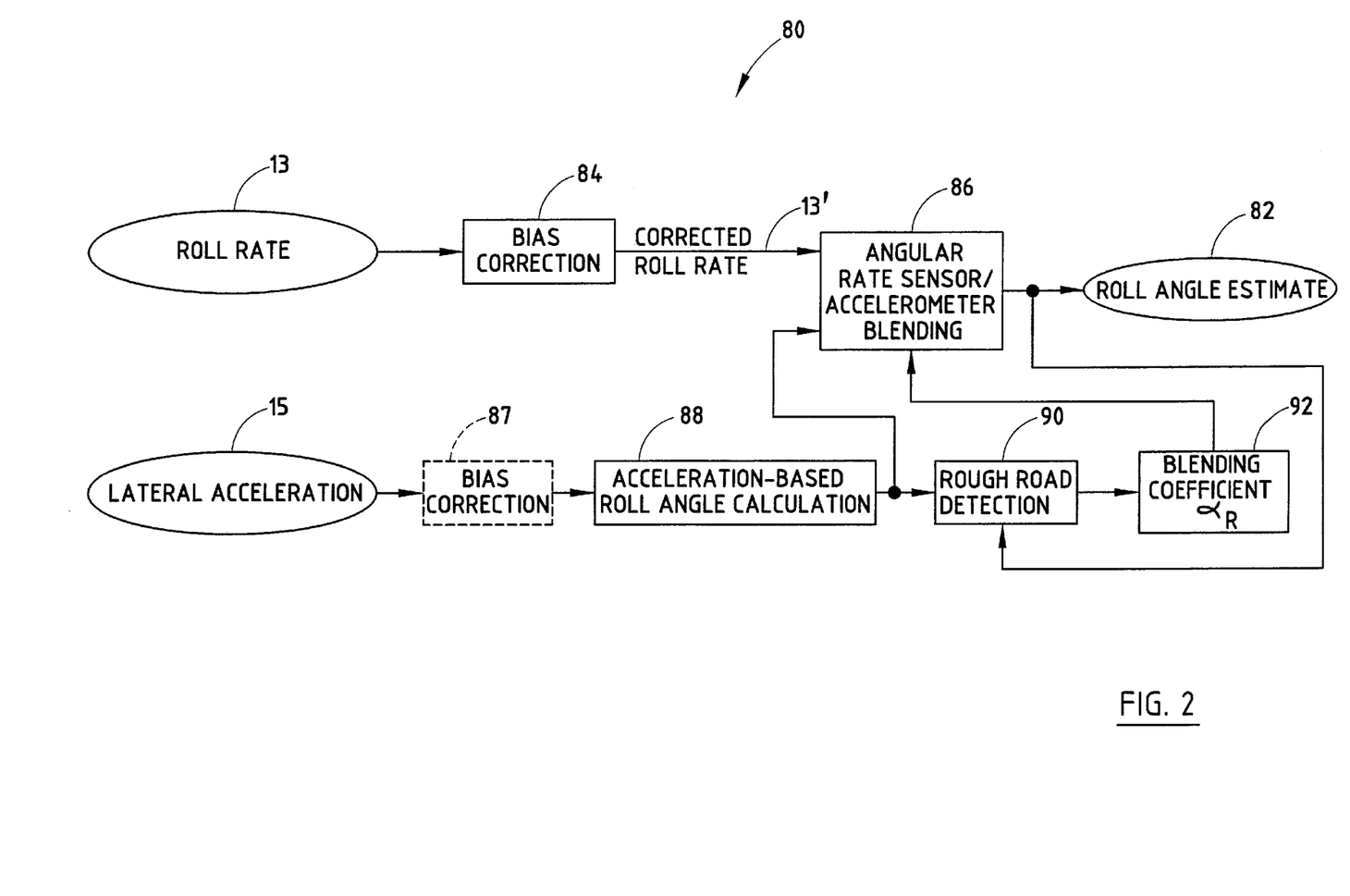
FIG. 2 is a block diagram illustrating a single-axis roll angle estimator for estimating a roll angle of a vehicle according to one embodiment of the present invention.
Figure 3A:
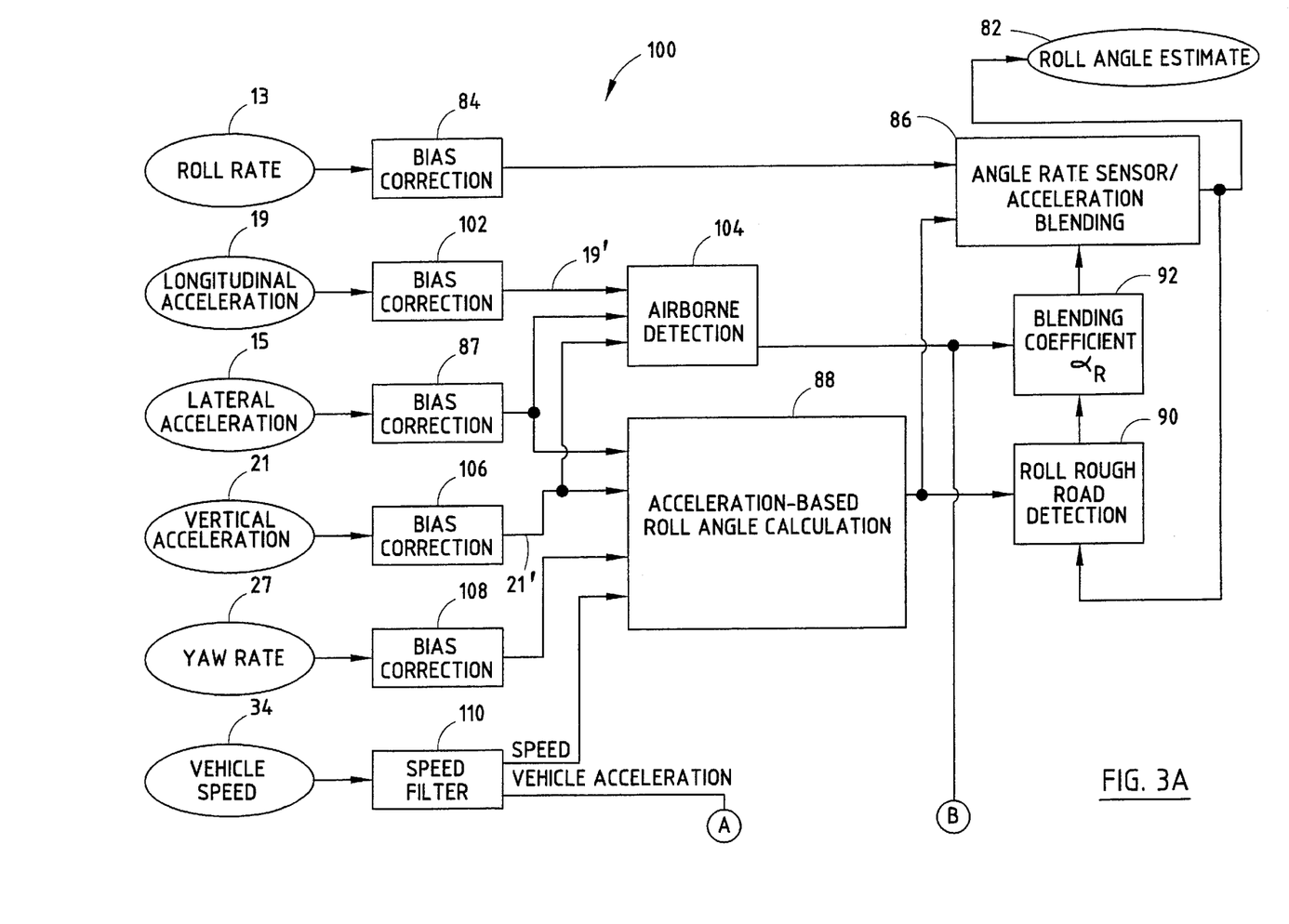
FIGS. 3A and 3B are block diagrams illustrating a dual-axes angle estimator for estimating roll and pitch angles of a vehicle according to a second embodiment of the present invention.
Figure 3B:
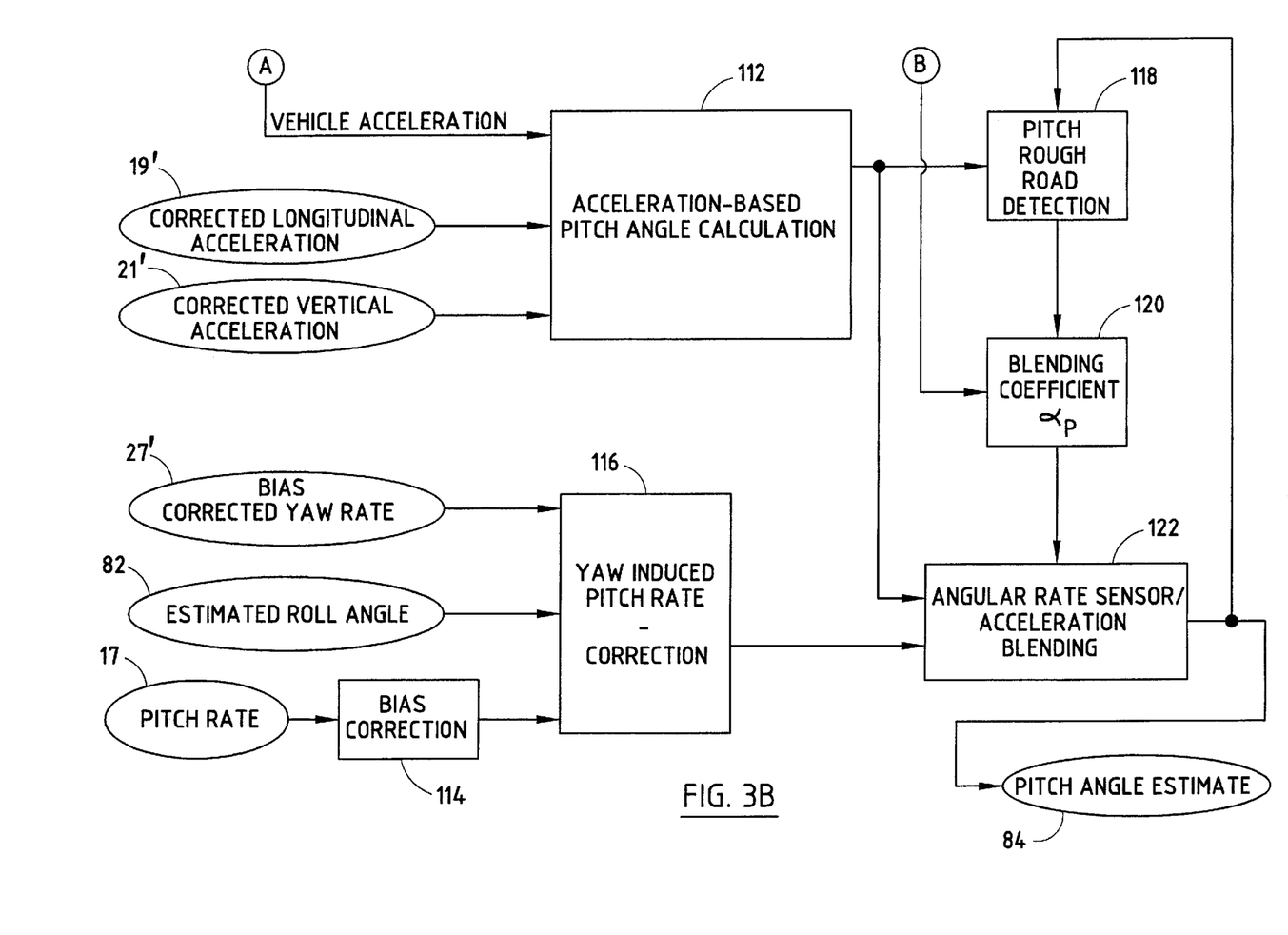

Referring to FIG. 2, implementation of a single-axis roll angle estimator 80 is illustrated therein for estimating the roll angle by sensing the roll rate signal 13 and the lateral acceleration signal 15 generated by roll angular rate sensor 12 and lateral accelerometer 14, respectively. Roll angle estimator 80 includes bias correction circuit 84 and an optional bias connection circuit 87 for providing bias correction to the measured roll rate signal 13 and lateral acceleration signal 15, respectively. Bias-correction circuits 84 and 87 may include a low-pass filter that produces an average value over a designated period of time which, for example, may include two minutes, and further subtracts the low-pass filter output from the measured signal to produce the bias-corrected signals.

Roll angle estimator 80 also includes an acceleration-based roll angle calculation circuit 88 which receives the bias-corrected lateral acceleration signal 15 and, in response thereto, calculates an accelerometer-based roll angle. A rough road detection circuit 90 monitors the acceleration-based roll angle and determines if a rough road condition exists that affects lateral side-to-side motion of the vehicle. This may be accomplished by rough road detection circuit 90 comparing the acceleration-based roll angle with the previous acceleration-based roll angle and the last determined roll angle, and, if there is substantial disagreement in the comparison, it produces a rough road condition signal. A blending coefficient circuit 92 is provided for generating a roll blending coefficient $\alpha_R$ which determines the proportion of signal blending between the accelerometer-based roll angle calculation and the time-updated roll angle estimate which is partially derived from the sensed angular roll rate. If a rough road condition is detected, the blending coefficient $\alpha_R$ is preferably set so that the roll angle estimate ignores the accelerometer-based roll angle calculation.

The roll angle estimator 80 also includes an angular rate sensor/accelerometer blending circuit 86. Blending circuit 86 receives the bias corrected roll rate 13' and the accelerometer-based roll angle, as well as the roll blending coefficient $\alpha_R$. Angular rate sensor/accelerometer blending circuit 86 contains a discrete-time blending algorithm which determines the overall roll angle estimate 82 as a function of the time-updated measurement angle estimator, the accelerometer-based roll angle, and the roll blending coefficient $\alpha_R$. The discrete-time blending algorithm is explained in more detail hereinafter. The roll angle estimate 82 produced by roll angle estimator 80 provides an estimated value of the vehicle's roll angle about the horizontal axis of the vehicle only. While a single-axis roll angle estimator is shown and described herein, it should be understood that the teachings of the present invention likewise provide for a single-axis pitch angle estimator which, instead of the input shown, preferably receives the pitch rate signal 17 and longitudinal acceleration signal 19 and determines a pitch blending coefficient $\alpha_P$ and to estimate a pitch angle.

Referring to FIGS. 3A and 3B, a dual-axes roll and pitch estimator 100 is illustrated therein. The dual-axes roll and pitch estimator 100 includes the same features of the single-axis roll angle estimator 80 shown in FIG. 2, with the addition of other features for providing a pitch angle estimate 84, and also provides other sensor inputs that may be employed in connection with producing the roll angle estimate 82 and pitch angle estimate 84. In addition to the roll rate signal 13 and lateral acceleration signal 15, the dual-axes attitude angle estimator 100 further receives the longitudinal acceleration signal 19, vertical acceleration signal 21, yaw rate signal 27, and pitch rate signal 17, which are bias corrected via respective bias correction circuits 102, 106, 108, and 114. Bias correction circuits 102, 106, 108, and 114 may be configured similar to circuits 84 and 87. Additionally, the dual-axes attitude angle estimator 100 employs an acceleration-based pitch angle calculation circuit 112 which receives the bias corrected longitudinal acceleration 19' and the bias corrected vertical acceleration 21', as well as a vehicle acceleration signal from the speed filter 110. A pitch rough road detection circuit 118 is provided and receives the acceleration-based pitch angle calculation to determine if a rough road condition exists with a longitudinal back-to-front motion of the vehicle. This may likewise be accomplished by comparing the acceleration-based pitch angle with the previous acceleration-based pitch angle and the last determined pitch angle estimate, and if there is substantial disagreement in this comparison, it detects a pitch rough road condition.

A blending coefficient circuit 120 is provided for determining a pitch blending coefficient $\alpha_P$ for use in determining the pitch angle estimate 84. An angular rate sensor/accelerometer blending circuit 122 is included for receiving the pitch blending coefficient $\alpha_P$ from blending circuit 120, as well as the accelerometer-based pitch angle calculation and a yaw induced pitch rate correction signal from yaw induced pitch rate correction circuit 116. The angular rate sensor/accelerometer blending circuit 122 blends the received signals of the function of the pitch blending coefficient $\alpha_P$. The yaw induced pitch rate correction circuit 116 receives the biased corrected pitch rate, estimate roll angle 82 and biased corrected yaw rate 27' which determines the amount of pitch rate induced by yaw, so that the yaw induced components can be subtracted from the pitch rate as a signal correction.

In addition, the dual-axes roll and pitch angle estimator 100 further shown employing an airborne detection circuit 104 which receives the bias corrected longitudinal acceleration signal 19', bias corrected lateral acceleration signal, and the bias corrected vertical acceleration signal 21'. Airborne detection signal 104 detects an airborne condition of the vehicle, which may then be used to generate the roll blending coefficient $\alpha_R$ in blending circuit 92. The airborne determination is accomplished by comparing the magnitude of the vector sum of the three accelerometer signals 19, 15, and 21 to a threshold value. The roll blending coefficient $\alpha_R$ may be set to a value to ignore the acceleration-based roll angle calculation during a detected airborne condition, as well as during a rough road condition.

Further, the acceleration-based roll angle calculation circuit 88 of estimator 100 is shown receiving the biased corrected lateral acceleration, as well as other inputs which include the vertical acceleration, yaw rate signal, and a vehicle speed signal 34 which is filtered via speed filter 110. Accordingly, the acceleration-based roll angle calculation may be determined based on the lateral acceleration signal alone, or in combination with other signals.

It should be appreciated that the single-axis attitude angle estimator 80 shown in FIG. 2, and the dual-axes attitude angle estimator 100 shown in FIGS. 3A and 3B, can be implemented by the microprocessor control unit (MCU) 22 on sensing module 10. While individual features of the estimators 80 and 100 are explained as circuits, such features can be implemented in an analog circuit or performed by digital processing carried out in accordance with programmed algorithms.

Accordingly, the dual-axes roll and pitch angle estimator 100 provides independent roll and pitch estimations, each of which preferably assumes the other angle is approximately zero degrees. The pitch and roll channels each use the blending scheme described herein to blend the appropriate angular rate signal with the appropriate acceleration-based angle estimate. In the roll channel, the acceleration-based angle estimate is derived under the assumption that a vertical gravitational acceleration is present, along with a horizontal lateral acceleration due to vehicle maneuvering. In a steady-state circular turn, the magnitude of the horizontal acceleration is the product of the vehicle's yaw rate and vehicle speed. The vehicle's yaw rate could be estimated using the estimated attitude angles and the body-based angular rates, or can be approximated using the body-based yaw rate sensor alone. With the earth-based horizontal and vertical acceleration estimates, the lateral and vertical accelerometers can be used to determine the acceleration-based roll angle estimate.

In the pitch channel, the horizontal longitudinal acceleration is estimated using the derivative of the vehicle speed. The acceleration-based pitch angle is then derived using the vertical and longitudinal accelerometers. With the blending scheme, transient error present in the acceleration-based angle estimates are low-pass filtered, so the blending coefficient is adjusted to a value which is an optimal tradeoff between ignoring these transient errors and having immunity to unknown angular rate sensor biases. Accordingly, the blending coefficients of $\alpha_R$ and $\alpha_P$ are variable in that they may be adjusted for transient errors or drift present in acceleration-based sensors and angular rate sensors which are employed to provide the overall roll and pitch angle estimates.

The signal blending according to the present invention includes recording a measurement-updated angle estimate, integration of the measured angular rate signal sensor to obtain a change in angle value and providing a time-updated angle estimate. The time-updated angle estimate is blended with the acceleration-based angle estimator to determine the angle estimate. The blending employed in the angular rate sensor/acceleration blending circuits 86 and 122 each provide for a discrete-time blending algorithm which may be represented by the following equations.

$$\phi^{(-)}_{k+1} = \phi^{(+)}_k + \Delta \cdot P_k$$

$$\phi^{(+)}_{k+1} = \phi^{(-)}_{k+1} \alpha (\phi^{\alpha}_{k+1} - \phi^{(-)}_{k+1})$$

Where $\phi^{(-)}_{k+1}$ is the time-updated angle estimate at time (k+1) which is equal to the measurement-update angle estimate $\phi^{(+)}_k$ at the previous time instant (k) summed with the integration of the measured angular rate. The measured angular rate integration is equal to the product of the measured angular rate $P_k$ and the discrete-time interval $\Delta$ which is the time period between k and k+1. As shown in the latter equation, the measurement-updated angle estimate $\phi^{(+)}_{k+1}$ at time instant (k+1) is derived by summing the time-updated angle estimate $\phi^{(-)}_{k+1}$ at time instant (k+1) with a blended proportion of the difference between the accelerometer-based angle estimate $\phi^{\alpha}_{k+1}$ and the time-update angle estimate $\phi^{(-)}_{k+1)}$ at time instant (k+1). Accordingly, the difference between the accelerometer-based angle estimate and time-updated angle estimate is multiplied by the blending coefficient $\alpha_R$ or $\alpha_P$ which may be variable between a value of 0 and 1.

It is preferred, that during either a rough road condition or an airborne condition, the blending coefficient $\alpha$ be set to 0, so as to nullify an effect on the accelerometers employed. Accordingly, either the time-updated estimate $\phi^{(-)}_{k+1}$, when $\alpha$ equals 0, or the measurement-updated angle estimate $\phi^{(+)}_{k+1}$, when $\alpha$ is not equal to 0, represents the overall angle estimate which is provided as the output of the blending process. Accordingly, the measurement-updated angle estimate $\phi^{(+)}_{k+1}$ is used if a filtered estimate is desired, i.e., one which depends on data available up to an including time instant (k), while the time-updated angle estimate $\phi^{(-)}_{k+1}$ is used if a predicted estimate is desired for only data prior to time instant (k+1).

The acceleration-based roll angle and pitch angle calculations may be obtained from a lookup table, or can be computed as real time computations. It should be appreciated that there are various techniques available for computing an acceleration-based roll angle and an acceleration-based pitch angle that may be employed in connection with the present invention. As example, the acceleration-based roll angle calculation may be computed according to either of the following two equations:

$$\phi^\alpha_k = -\arcsin(A_y/G)$$

or $$\phi^\alpha_k = -\arctan(A_y/G)$$

where $A_y$ represents the measured lateral acceleration, and G represents the earth's gravitational acceleration which is equal to approximately 9.81 m/sec².

Likewise, as examples, the acceleration-based pitch angle calculation may be provided according to either of the following two equations:

$$\phi^\alpha_k = \arcsin(A_x/G)$$

or $$\phi^\alpha_k = \arcsin(A_x/G)$$

where $A_x$ indicates the measured longitudinal acceleration, and G equals the earth's gravitational acceleration. Accordingly, the acceleration-based roll and pitch angle calculations may be provided in accordance with the above-identified equations, or otherwise computed as known in the art.

The blending scheme of the present invention effectively integrates the angular rate sensed signal over the last time interval, adds it into the previous overall angle estimate, and then slightly corrects the new estimate towards the acceleration-based angle estimate at the current time instant. The blending coefficient $\alpha$ adjusts the fractional level of this correction such that, at the extremes, if $\alpha$ equals 0, the acceleration-based estimate is ignored, and if $\alpha$ equals 1 the angular rate sensed signal is ignored. If the blending coefficient $\alpha$ is small, errors in the acceleration-based estimate are effectively low-pass filtered. If the angular rate sensor and accelerometer agree on the rapidly-changing angle, there is no filtering lag associated with the blending. In addition, an unknown angular rate sensor bias leads to a constant error in the overall angle estimate, instead of an ever-increasing error. Accordingly, the blending coefficient trades off between the bandwidth of the low-pass filtering of the acceleration-based estimate and the gain from the angular rate sensor bias to the consequent angular estimation error. The heavier the low-pass filtering, the larger the error produced by an unknown angular rate sensor bias. Accordingly, the blending coefficient may be allowed to vary in time, depending on the output of the rough road detection circuit and the airborne detection circuit, and used to determine the overall attitude angle of the vehicle.

Figure 4A:
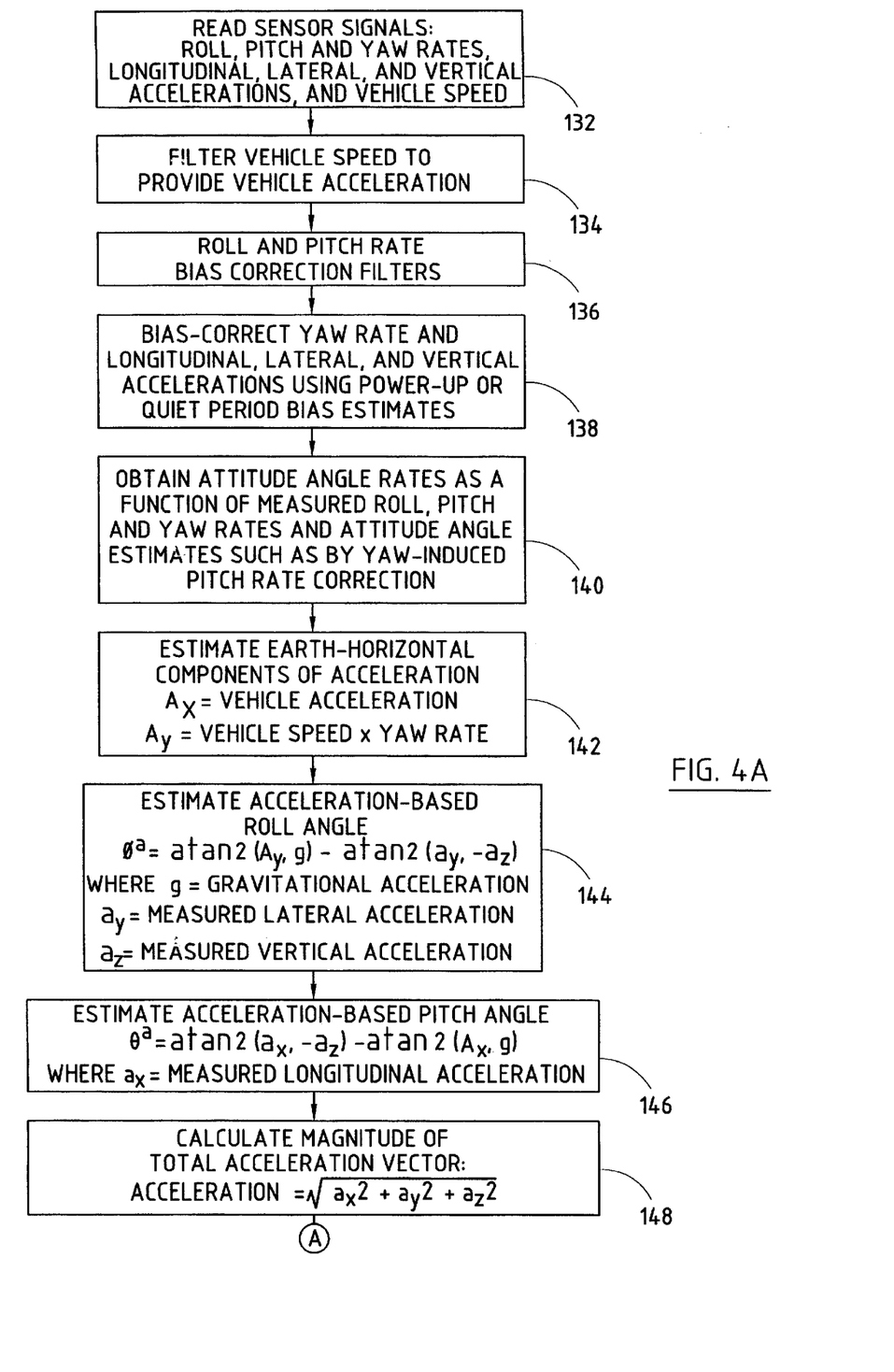
FIGS. 4A–4C are flow diagrams illustrating a methodology for estimating the roll and pitch angles of a vehicle according to the second embodiment of the present invention.
Figure 4B:
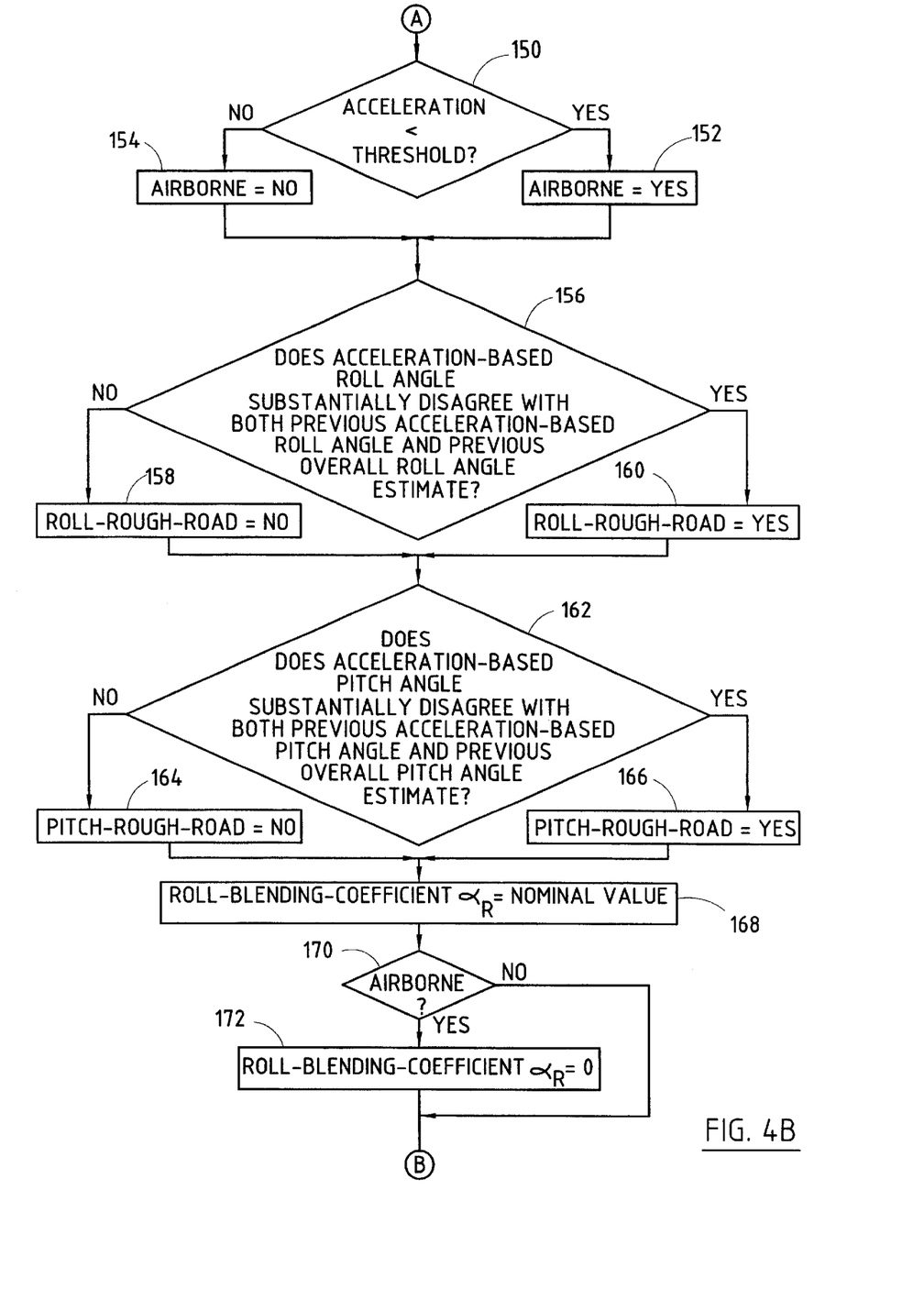
Figure 4C:
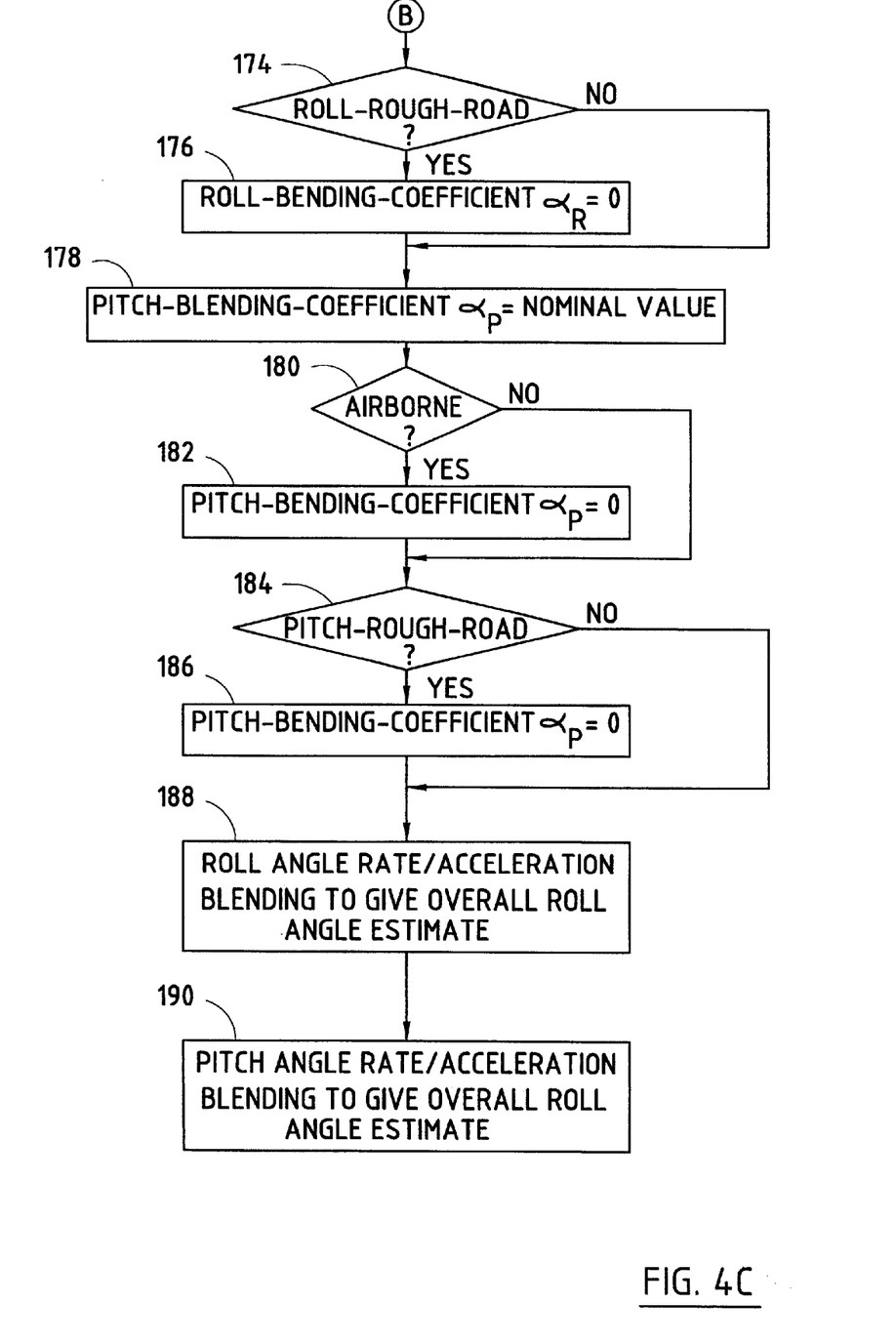

Referring to FIGS. 4A–4C, a roll and pitch angle estimate methodology 130 is illustrated therein according to the dual-axes roll and pitch estimate approach of FIGS. 3A and 3B. In step 132, methodology 130 reads the sensor signals including roll, pitch, and yaw rates, and longitudinal, lateral, and vertical acceleration signals, as well as vehicle speed. Next, methodology 130 filters the vehicle speed to provide for vehicle acceleration in step 134. The filtering may be accomplished by determining the derivative of vehicle speed. In step 136, the roll and pitch rate signals are biased corrected. In step 138, the yaw rate and longitudinal, lateral, and vertical acceleration signals are biased corrected using power-up or quiet period bias estimates.

In step 140, methodology 130 obtains the attitude angle rates as a function of the measured roll, pitch, and yaw rates and the attitude angle estimates. This can be accomplished by using the yaw-induced pitch rate correction, according to one example. The estimate of earth-horizontal components of acceleration are determined in step 142, which includes the vehicle longitudinal acceleration Ax, and vehicle lateral acceleration $A_y$. In step 144, methodology 130 estimates the acceleration-based roll angle. This may be achieved by performing an arctangent calculation as set forth above, or may employ the atan 2 function as shown, which allows for a larger angular range of 0 to 360 degrees. In step 146, methodology 130 estimates the acceleration-based pitch angle by performing an arctangent calculation as set forth above, or by employing the atan 2 function as shown in block 146. The magnitude of the total acceleration vector is then calculated as shown in step 148.

Referring to step 150, methodology 130 compares the total acceleration magnitude to a predetermined threshold to determine if the vehicle is airborne. If the acceleration magnitude exceeds the threshold, an airborne condition is indicated in step 152. Otherwise, step 154 indicates that no airborne condition is present. Proceeding to decision step 156, methodology 130 determines if a rough road condition is present for vehicle roll. This achieved by checking whether the acceleration-based roll angle substantially disagrees with both the previous acceleration-based roll angle and the previous overall roll angle estimate. If this condition is met, a roll rough road condition is set in step 160. Otherwise, step 158 indicates that no roll rough road condition is detected. Similarly, methodology 130 proceeds to decision step 162 to determine if a pitch rough road condition exists. This includes checking to see if the acceleration-based pitch angle substantially disagrees with both the previous acceleration-based pitch angle and previous overall pitch angle estimate. If so, a pitch rough road condition is indicated in step 166. Otherwise, in step 164 no pitch rough road condition is indicated.

Proceeding on to step 168, the roll blending coefficient $\alpha_R$ is set to a nominal value of between 0 and 1. In step 170, methodology 130 checks for an airborne condition and, if an airborne condition is detected, proceeds to step 172 to set the roll blending coefficient $\alpha_R=0$. Thereafter, methodology 130 proceeds to step 174 to check if a roll rough road condition has been set and, if so, proceeds to step 176 to set the roll blending coefficient $\alpha_R=0$.

Methodology 130 then proceeds to step 178 to set the pitch blending coefficient $\alpha_P$ to a nominal value of between 0 and 1. Proceeding to step 180, methodology 130 checks for an airborne condition and, if present, proceeds to step 182 to set the pitch blending coefficient $\alpha_P=0$. Thereafter, methodology 130 proceeds to step 184 to check if the pitch rough road condition has been met and, if so, proceeds to step 186 to set the pitch blending coefficient $\alpha_P=0$.

Thereafter, methodology 130 proceeds to step 188 to perform roll angular rate/acceleration blending to give an overall roll angle estimate 82. Proceeding on, methodology 130 goes to step 190 to perform the pitch angular rate/acceleration blending to give the overall pitch angle estimate 84 according to the present invention. Accordingly, attitude angle estimation methodology 130 produces both a roll angle estimate 82 and a pitch angle estimate 84 for the vehicle.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A method for estimating an attitude angle of a vehicle, said method comprising the steps of:
sensing angular attitude rate of a vehicle and producing an output signal indicative thereof;
sensing one of lateral and longitudinal acceleration of the vehicle and producing an output signal indicative thereof;
producing an attitude angle estimate;
updating said attitude angle estimate as a function of said sensed angular attitude rate;
determining an acceleration-based attitude angle as a function of said sensed acceleration;
providing a blending coefficient; and
generating a current vehicle attitude angle estimate as a function of said updated attitude angle estimate, said acceleration-based attitude angle, and said blending coefficient.

2. The method as defined in claim 1 further comprising the step of detecting a rough road condition of the vehicle, and adjusting said blending coefficient as a function of said rough road detection.

3. The method as defined in claim 2, wherein said step of detecting a rough road condition of the vehicle includes detecting the rough road condition of the vehicle as a function of the acceleration-based attitude angle.

4. The method as defined in claim 1 further comprising the step of detecting an airborne condition of the vehicle, and adjusting said blending coefficient as a function of said detected airborne condition.

5. The method as defined in claim 1, wherein said attitude angle comprises a roll angle, said sensed attitude rate comprises an angular roll rate, and said sensed acceleration comprises a lateral acceleration.

6. The method as defined in claim 1, wherein said attitude angle comprises a pitch angle, said sensed attitude rate comprises an angular pitch rate, and said sensed acceleration comprises a longitudinal acceleration.

7. The method as defined in claim 1, wherein said step of updating said attitude angle estimate includes the step of integrating said sensed angular attitude rate over a time period, and adding said integration with said attitude angle estimate.

8. The method as defined in claim 1, wherein said attitude angle estimate comprises the vehicle attitude angle estimate at a previous time period.

9. The method as defined in claim 1, wherein said step of generating said vehicle attitude angle estimate further comprises multiplying said blending coefficient by the difference between said acceleration-based angle estimate and said updated attitude angle estimate, and further adding said multiplication to said updated attitude angle estimate.

10. The method as defined in claim 1, wherein said blending coefficient has a value in the range of 0 to 1.

11. A method for estimating a roll angle of a vehicle, said method comprising the steps of:
sensing angular roll rate of a vehicle and producing an output signal indicative thereof;
sensing lateral acceleration of the vehicle and producing an output signal indicative thereof;
producing a roll angle estimate;
updating said roll angle estimate as a function of said sensed angular roll rate;
determining an acceleration-based roll angle as a function of said sensed lateral acceleration;
providing a roll blending coefficient; and
further updating said roll angle estimate as a function of said acceleration-based roll angle and said roll blending coefficient to generate a current vehicle roll angle estimate.

12. The method as defined in claim 11 further comprising the steps of:
sensing angular pitch rate of the vehicle and producing an output signal indicative thereof;
sensing longitudinal acceleration of the vehicle and producing an output signal indicative thereof;
producing a pitch angle estimate;
updating said pitch angle estimate as a function of said sensed angular pitch rate;
determining an acceleration-based pitch angle as a function of said sensed longitudinal acceleration;
providing a pitch blending coefficient; and
further updating said pitch angle estimate as a function of said acceleration-based pitch angle and said pitch blending coefficient to generate a current vehicle pitch angle estimate.

13. The method as defined in claim 11 further comprising the step of detecting a rough road condition of the vehicle, and adjusting said roll blending coefficient as a function of said detected rough road condition.

14. The method as defined in claim 11 further comprising the step of detecting an airborne condition of the vehicle, and adjusting said roll blending coefficient as a function of said detected airborne condition.

15. The method as defined in claim 12 further comprising the step of detecting a rough road condition of the vehicle, and adjusting said pitch blending coefficient as a function of said detected rough road condition.

16. The method as defined in claim 11, wherein said step of updating said roll angle estimate includes a step of integrating said sensed angular roll rate over a time period, and adding said integration to said roll angle estimate.

17. The method as defined in claim 11, wherein said step of further updating said roll angle estimate comprises multiplying said roll blending coefficient by the difference between said acceleration-based roll angle and said updated roll angle estimate, and further adding said multiplication to said updated roll angle estimate.

18. A vehicle attitude angle estimator for use in a vehicle, said vehicle angle estimator comprising:
an angular attitude rate sensor for sensing angular attitude rate of a vehicle and producing an output signal indicative thereof;
an accelerometer for detecting one of lateral and longitudinal acceleration of the vehicle and producing an output signal indicative thereof;
a controller for producing an attitude angle estimate and updating said attitude angle estimate as a function of said sensed angular attitude rate; said controller determining an acceleration-based attitude angle as a function of said sensed acceleration, said controller further providing a blending coefficient and generating a current vehicle attitude angle estimate as a function of said updated attitude angle estimate, said acceleration-based attitude angle, and said blending coefficient.

19. The vehicle angle estimator as defined in claim 18 further comprising a rough road detector for detecting a rough road condition of the vehicle, wherein said blending coefficient is adjusted as a function of said detected rough road condition.

20. The vehicle angle estimator as defined in claim 18 further comprising an airborne detector for detecting an airborne condition of the vehicle, wherein said blending coefficient is adjusted as a function of said detected airborne condition.

21. The vehicle angle estimator as defined in claim 18, wherein said angular attitude rate sensor comprises an angular roll sensor for sensing angular roll rate, and said accelerometer comprises a lateral accelerometer for sensing lateral acceleration, wherein said controller produces a roll angle estimate and updates the roll angle estimate as a function of the sensed angular roll rate, and said controller determines an acceleration-based roll angle as a function of the sensed lateral acceleration, said controller further provides a roll blending coefficient and generates a current vehicle roll angle estimate by further updating the roll angle estimate as a function of the acceleration-based roll angle and the roll blending coefficient.

22. The vehicle attitude angle estimator as defined in claim 21 further comprising:

an angular pitch rate sensor for sensing angular pitch rate of the vehicle and producing an output signal indicative thereof;

a longitudinal accelerometer for detecting longitudinal acceleration of the vehicle and producing an output signal indicative thereof; and said controller produces a pitch angle estimate and updates said pitch angle estimate as a function of said sensed angular pitch rate, and said controller determines an acceleration-based pitch angle as a function of said sensed longitudinal acceleration, said controller further providing a blending coefficient and generating a current vehicle pitch angle estimate by further updating said pitch angle estimate as a function of said acceleration-based pitch angle and said pitch blending coefficient.

23. The vehicle angle estimator as defined in claim 18, wherein said angular attitude rate sensor comprises an angular pitch rate sensor for sensing angular pitch rate and said accelerometer comprises a longitudinal acceleration for detecting longitudinal acceleration, said controller producing a pitch angle estimate and updating said pitch angle estimate as a function of said sensed angular pitch rate, and said controller determining an acceleration-based pitch angle as a function of said sensed longitudinal acceleration, said controller further providing a pitch blending coefficient and further updating said pitch angle estimate as a function of said acceleration-based pitch angle and said pitch blending coefficient to generate a current vehicle pitch angle estimate.

24. The vehicle angle estimator as defined in claim 18, wherein said controller generates said current vehicle attitude angle estimate by multiplying said blending coefficient by the difference between the acceleration-based angle estimate and the updated attitude angle estimate, said controller further adding said multiplication to the updated attitude angle estimate.

25. The vehicle angle estimator as defined in claim 18, wherein said rough road detector detects the rough road condition of the vehicle as a function of said acceleration-based attitude angle.

* * * * *